No. 844,403. PATENTED FEB. 19, 1907.
D. ROBINSON.
WHEEL.
APPLICATION FILED AUG. 11, 1906.

Witnesses:
H. B. Davis.
Cynthia Doyle.

Inventor:
Duncan Robinson
by Noyes & Harriman
Attys

UNITED STATES PATENT OFFICE.

DUNCAN ROBINSON, OF BROOKLINE, MASSACHUSETTS.

WHEEL.

No. 844,403.  Specification of Letters Patent.  Patented Feb. 19, 1907.

Application filed August 11, 1906. Serial No. 330,157.

*To all whom it may concern:*

Be it known that I, DUNCAN ROBINSON, of Brookline, county of Norfolk, State of Massachusetts, have invented an Improvement in Wheels, of which the following description, in connection with the accompanying drawings, is a specification, like characters on the drawings representing like parts.

This invention relates to wheels, and has for its object to improve the construction of the same, to the end that the felly and spokes, which form the outer part of the wheel, are yieldingly supported upon the hub or inner part of the wheel and are also yieldingly connected with the hub, and, furthermore, are held against lateral movement with respect to the hub.

The invention consists in a wheel having a pneumatic tubular ring interposed between the outer part of the wheel and the hub, and springs, which are arranged at opposite sides of said wheel and which are connected at their ends to the outer part of the wheel and to the hub, thereby yieldingly supporting the outer part of the wheel on the hub and also yieldingly connecting it with the hub and providing against lateral movement of the outer part of the wheel with respect to the hub.

Figure 1:
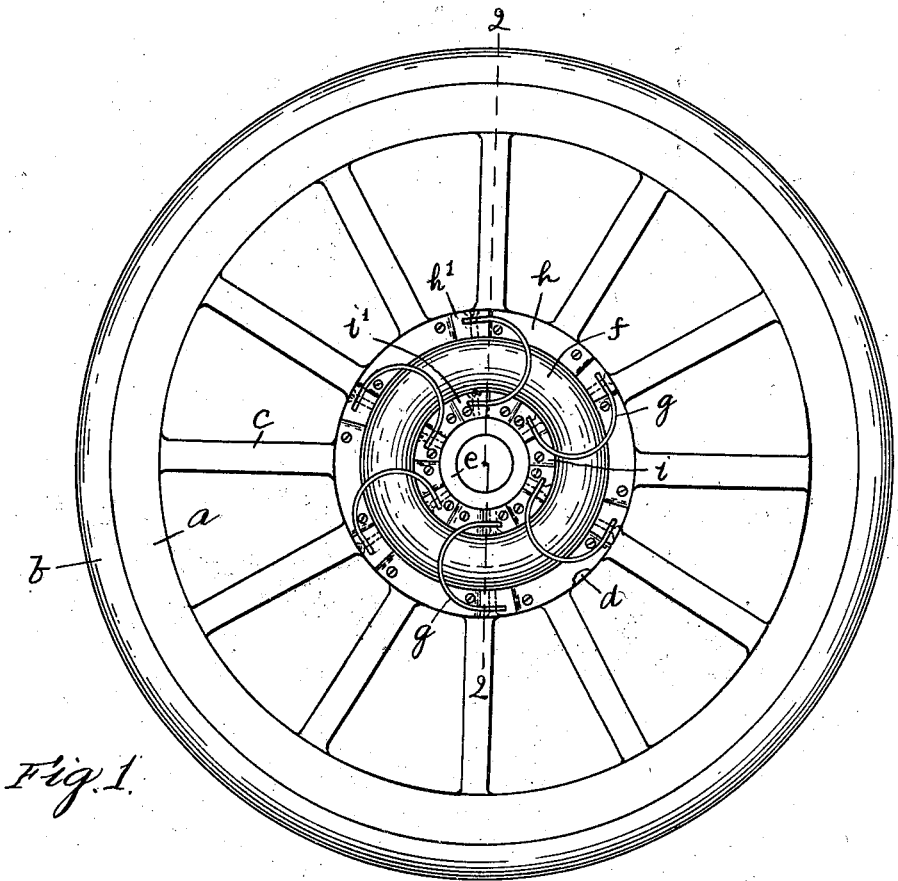
Figures 2, 3:
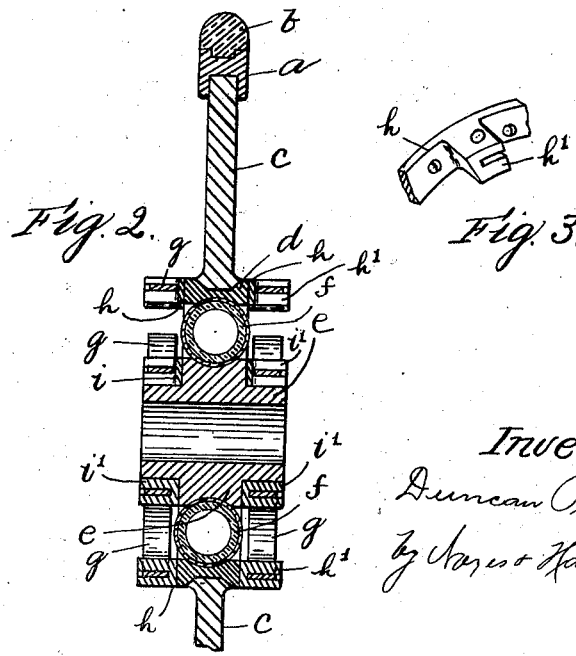

Figure 1 shows in side elevation a wheel embodying this invention. Fig. 2 is a vertical section of the wheel shown in Fig. 1, taken on the dotted line 2 2. Fig. 3 is a sectional detail to be referred to.

$a$ represents the felly, $b$ the tire thereon, $c$ the spokes, all of usual or suitable construction, and $d$ a ring into which the spokes are fitted and to which they are connected in any usual or suitable manner.

$e$ represents the hub of the wheel, which is made of lesser diameter than the ring $d$. A pneumatic tubular ring $f$ is placed between the ring $d$ and hub $e$, and said ring and hub are or may be both grooved to receive said ring and assist in holding it in place. The pneumatic tubular ring will be provided with a valve as usual in pneumatic tires. At both sides of the pneumatic ring a set of springs are provided which are connected to the ring $d$ and to the hub. As herein shown, C-springs $g$ are employed for this purpose, as many of them being provided as desired, and they will be arranged at regular distances apart around the wheel. To securely attach the springs $g$ to the ring $d$ and to the hub, a ring $h$ is secured to each side of said ring $d$, having projections $h'$, and a ring $i$ is secured to each end of the hub $e$, having projections $i'$. The projections $h'$ and $i'$ are slotted or recessed to receive the ends of the springs $g$ and are provided with holes through which screws or bolts pass, which pass through holes in the ends of the springs to thereby rigidly secure the ends of the springs to the projections. Any one of the springs $g$ may thus be readily removed, or, if desired, the rings $h$ and $i$ at either side of the wheel may be removed, thereby providing for easily repairing the wheel when necessary. When the inner ends of the springs are connected to the hub and their outer ends to the ring $d$, it will be observed that both ends of each spring occupy the same radial position with respect to the wheel. The springs thus provided not only serve as a yielding connection between the outer part of the wheel and its hub or inner part, but also serve to prevent undue lateral movement of the outer part of the wheel with respect to its hub—as, for instance, when the vehicle is turned quickly—the springs $g$ being made quite strong to enable them to withstand such lateral strain. The springs $g$ therefore act to hold the outer part of the wheel in a predetermined position with respect to its hub. I prefer to employ C-springs for this purpose, as they take the strain in a yielding manner in all the different positions they are caused to occupy when traveling around with the wheel.

Having thus described my invention, what I claim as new, and desire to secure by Letters Patent, is—

1. A wheel comprising a felly, spokes and ring $d$ connected together, a hub of lesser diameter than the ring $d$, a pneumatic ring interposed between the ring $d$ and the hub and springs at opposite sides of the wheel connected at their outer ends to said ring $d$ and at their inner ends to said hub, both ends of each spring occupying the same radial position with respect to the wheel, substantially as described.

2. A wheel comprising a felly, spokes and ring $d$ connected together, a hub of lesser diameter than the ring $d$, a pneumatic ring interposed between said ring $d$ and the hub, a plurality of C-springs at both sides of the wheel connected at their outer ends to said ring $d$ and at their inner ends to the hub, both ends of each spring occupying the same radial position with respect to the wheel, substantially as described.

3. A wheel comprising a felly, spokes and ring $d$ connected together, a hub of lesser diameter than the ring $d$, a pneumatic ring interposed between said ring $d$ and the hub, a plurality of C-springs at both sides of the wheel, supports attached to the ring $d$ to which the outer ends of said springs are attached and supports attached to the hub to which the inner ends of said springs are attached, substantially as described.

4. A wheel comprising a felly, spokes and ring $d$ connected together, a hub of lesser diameter than the ring $d$, a pneumatic ring interposed between said ring $d$ and the hub, a plurality of C-springs at both sides of the wheel, laterally-extended supports on the ring $d$ to which the outer ends of said springs are attached and supports on the hub to which the inner ends of said springs are attached, substantially as described.

5. A wheel comprising a felly, spokes and ring $d$ connected together, a hub of lesser diameter than the ring $d$, a pneumatic ring interposed between said ring $d$ and the hub, a set of springs at each side of the wheel, rings attached to the opposite sides of the ring $d$ to which the inner ends of said springs are attached and rings attached to the opposite ends of the hub to which the outer ends of said springs are attached, substantially as described.

6. A wheel comprising a felly, spokes and ring $d$ connected together, a hub of lesser diameter than the ring $d$, a pneumatic ring interposed between said ring $d$ and the hub, a set of C-springs at each side of the wheel, rings attached to the opposite sides of the ring $d$ having projections to which one of the ends of said springs are attached, and rings attached to the opposite ends of the hub having projections to which the other ends of said springs are attached, substantially as described.

In testimony whereof I have signed my name to this specification in the presence of two subscribing witnesses.

DUNCAN ROBINSON.

Witnesses:
B. J. NOYES,
D. H. HARRIMAN.